Aug. 15, 1933.   G. E. NICHOLS   1,922,776
HAULING DEVICE
Filed July 21, 1931   2 Sheets-Sheet 1

Inventor
George F. Nichols
By Cushman, Bryant & Darby
Attorneys

Aug. 15, 1933.   G. E. NICHOLS   1,922,776
HAULING DEVICE
Filed July 21, 1931   2 Sheets-Sheet 2
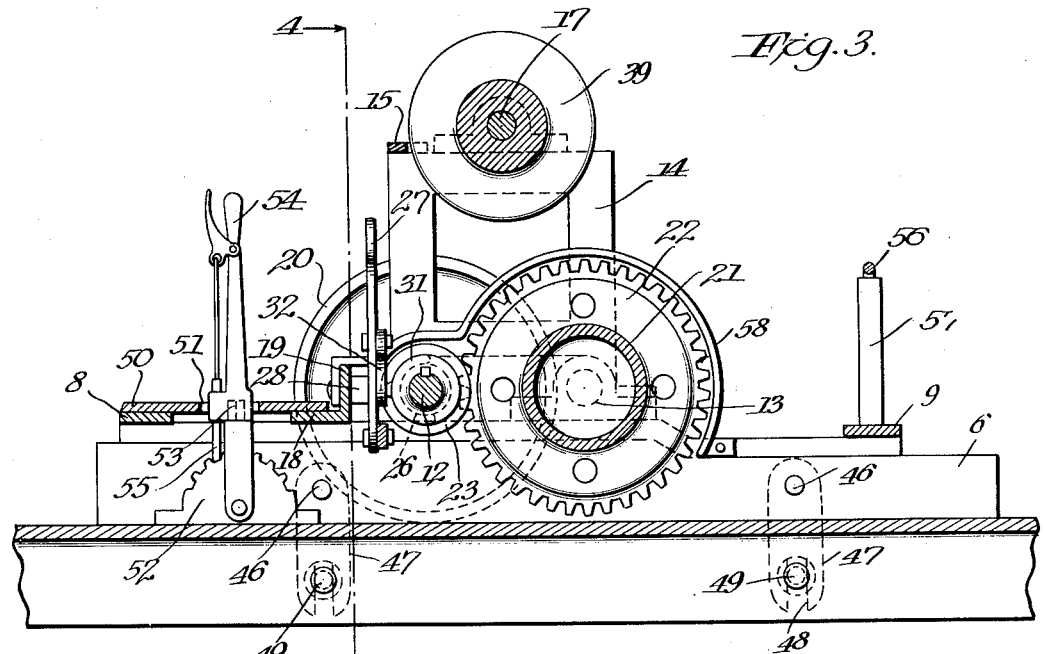
Fig. 3.
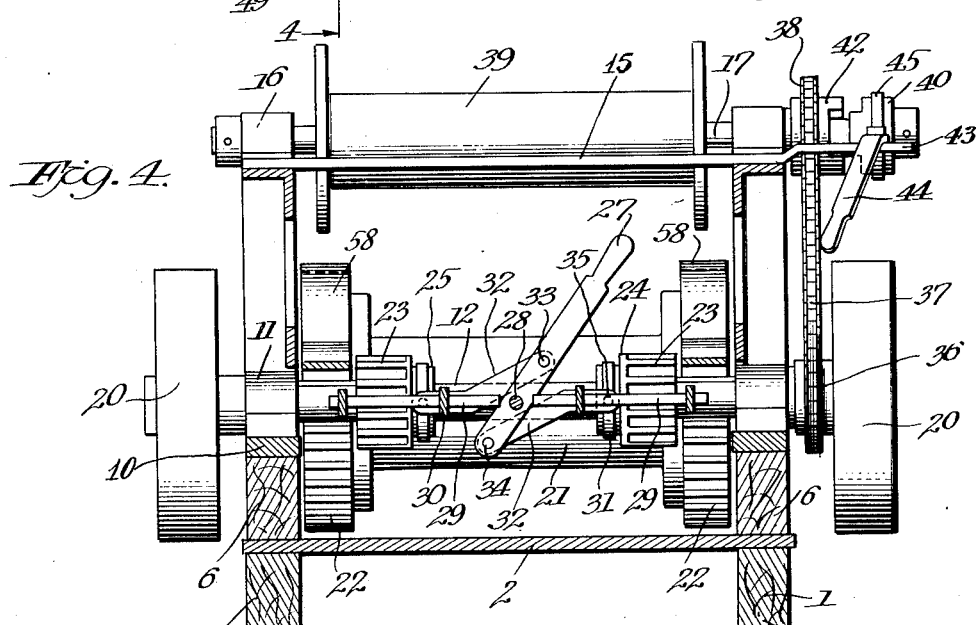
Fig. 4.
Fig. 5.
Inventor
George E. Nichols
By Cushman, Bryant & Darby
Attorneys Patented Aug. 15, 1933

1,922,776

UNITED STATES PATENT OFFICE 1,922,776

HAULING DEVICE

George E. Nichols, Abbeville, Ala.

Application July 21, 1931. Serial No. 552,259

3 Claims. (Cl. 254—166)

The invention relates to a hauling device which may be used in connection with the ordinary motor vehicle truck.

There has been found wanting, for the purposes and results desired, a hauling device of the portable type which is efficient and inexpensive, and which may be quickly and easily attached or detached from any motor truck without alteration of said truck.

It has been, therefore, my objective to provide a hauling device which may be quickly and easily attached or detached from any motor truck without the necessity of any change or alteration of the truck, and that the hauling device will derive power from the traction of the wheels thereof without installation of driving connections between the truck wheels and the hauling device. When in use, it will be found that the hauling device will provide a slow and powerful pull or a fast and less powerful pull, and that the construction of the hauling device will be found to be extremely simple, yet sturdy, most efficient, lasting in quality, and comparatively inexpensive to manufacture.

With these and other objects and advantages in mind, attention is called to the drawings in which:

Figure 3 is a sectional view taken on the line 3—3 of Figure 2, looking in direction of the arrows.

Figure 4 is a sectional view of the hauling device looking in the direction of the arrows on the line 4—4 of Figure 3.

Figure 5 is a detailed view of the supporting flange and its associating parts.

Figure 1:
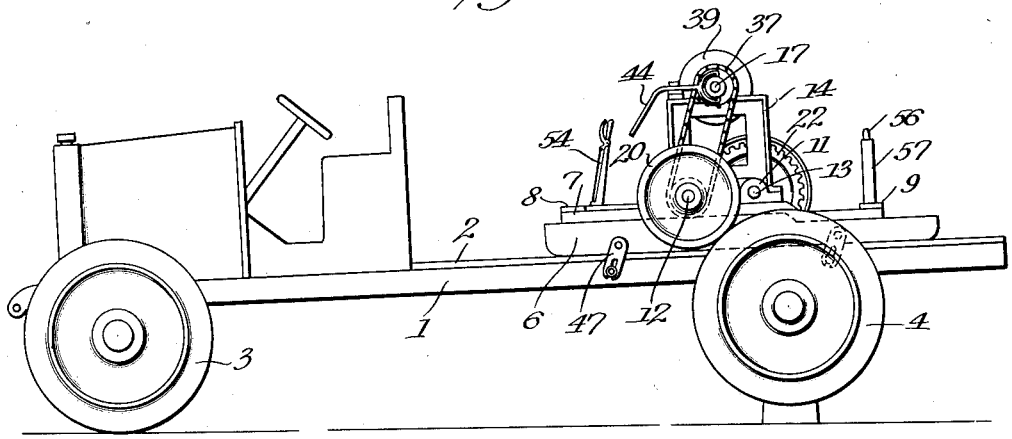
Figure 1 is a side view of the hauling device in operative position installed on the floor of an ordinary motor truck.
Figure 2:
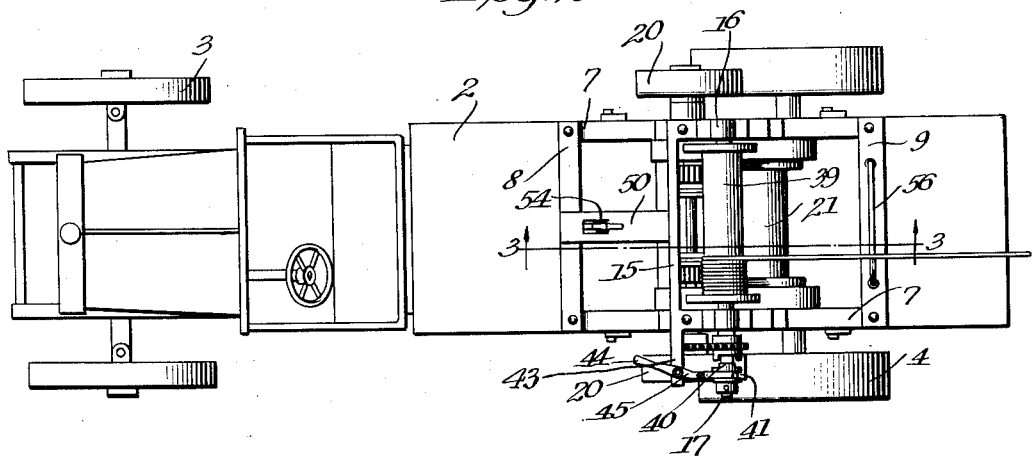
Figure 2 is a plan view of the hauling device, as shown in Figure 1.

Referring more particularly to the drawings, in which like numbers indicate like parts, the motor truck is of ordinary construction comprising a frame 1, having a floor 2, front wheels 3, and rear driving wheels 4.

The hauling device which forms my invention comprises base members 6, upon which is positioned and attached in any suitable manner, a frame having side members 7 and end members 8 and 9. Obviously, if desired, the base members 6 and the side members 7 can be made integral.

Mounted on the frame at each side is a shaft supporting member 10, having bearings 11 for the shafts 12 and 13. The members 10 are secured to the frame in any suitable manner or may, of course, be an integral part thereof.

Mounted above and, in the instance here shown, on the members 1 are supporting frames 14, having a brace 15, and provided on their tops with bearings 16, for a shaft 17.

Between the side members 7 is a brace 18, having an upwardly extending flange 19. The shaft 12 is the driving shaft, and is provided at both ends with pulley wheels 20, secured thereto in any suitable manner.

The shaft 13 is provided with a winding drum 21, adjacent to the ends of which are gear wheels 22.

A clutching means between the driving shaft 12 and the drum 21 is provided by the gears 23, splined to the shaft 12 for axial, but not rotative movement relative to said shaft.

It will be noted that the gears 23 have elongated teeth closed at their inner ends as at 24, and are provided with lateral extensions 25, having grooves 26.

The movement of the gears 23 axially on the shaft 12 into and out of engagement with the gears 22 is effected by the lever 27, pivotally mounted on the flange 19 at 28. Rods 29 are mounted for lateral movements in supports 30, attached to the flange 19, and have secured thereto the clutch yokes 31 which loosely and partially encircle the lateral extensions 25 in the grooves 26 of the gears 23. Arms 32 are pivoted to the lever 27 above and below the pivotal point 28 of the lever at 33 and 34, and are pivotally connected at their other ends to the rods 29 at 35.

It will thus be observed that movement of the lever will direct the gears 23 into or out of engagement with the gears 22, thereby effecting a driving connection between the shaft 12 and the drum 21.

Secured on the shaft 12 between one side member 7 and the adjacent pulley wheel 20 is a sprocket 36, around which a driving chain 37 extends upwardly and around a sprocket 38 mounted on the shaft 17 for rotation relative thereto.

The shaft 17 carries a winding drum 39, and has splined thereto, for axial, but not rotative movement relative thereto, a toothed member 40, having a groove 41 therein. The sprocket 36 has a lateral projection 42 provided with teeth which co-ordinate with the toothed member 40.

To an extension 43 of the brace 15, is pivoted a lever 44, having clutch yokes 45 which loosely and partially encircle the toothed member 40 in the groove 41.

It will thus be observed that, by movement of the lever 44, the teeth of the member 40 are directed into or out of engagement with the teeth of the lateral projection 42 of the sprocket 38, and a driving connection is thereby effected between the driving shaft 12 and the drum 39.

Pivotally attached to both sides of the frame near the ends thereof by any well known means, such as bolts 46, are strap-like metallic members 47, having at their lower ends slots 48. When the base members of the hauling device have been correctly positioned on the floor of the truck, the slots 48 will cooperate with the bolts 49 attached to the sides of the truck frame and prevent any lateral movement, but will allow longitudinal movement of the hauling device.

At the front end of the hauling device there is provided means for shifting the mechanism into and out of engagement with the traction wheels of the motor truck. Secured between the end member 8 and the brace 18 is a bar 50, having a slot 51 therein. A ratchet 52 is bolted or otherwise secured to the floor of the truck, and has pivotally and detachably secured thereto at 53, a handle 54, provided with a spring operated pawl 55 to cooperate with the ratchet, thereby holding the handle in a set position.

On the end piece 9, there will be observed a guiding device 56 for the rope or cable on the drums. It will be noted that on the vertical members of the guiding device there are rollers 57, the purpose of which is, of course, to eliminate all unnecessary friction between the cable or rope and the guiding device. Guards 58 are provided over the teeth of the gear wheels 22.

To install a hauling device, it is necessary only to secure the bolts 49 at the proper distances on each side of the truck frame and to attach the ratchet near the front end of and in a central position on the floor of the truck. Due to the fact that the ratchet is near the forward end of the truck floor it, in any instance, can be left permanently attached thereto as it is not likely to interfere in any use to which the truck is put when not carrying the hauling device. Likewise, the bolts on the sides of the truck frame need not be disturbed when once attached.

The hauling device is then secured upon the truck floor with the strap-like members and slots engaging the bolts 49.

Due to the rounded off end portions of the base members of the hauling device, it will easily move back and forth on the truck floor even though, through use, the truck floor may be rough and uneven.

The operation of the device after installation is extremely simple, and may be accomplished either while the truck is jacked up, in any well known manner, as shown in Figure 1, or while the truck is moving under its own power. By simply operating the handle backwardly, the flat pulley wheels will come into contact with the tires of the traction wheels of the truck, and power will be transmitted to the driving shaft 12 from whence the power may be transmitted to either of the winding drums or to both winding drums simultaneously. By simply operating the handle forwardly the flat pulley wheels are disconnected from the traction wheels of the truck and operation of the hauling device ceases.

It will be noted that the size of the winding drums differ, and that the driving connections between the driving shaft 12 and the said winding drums are such as to provide for the larger winding drum a slow and powerful pull, while in the instance of the smaller winding drum, the pull will be fast, but less powerful. In view of this, a device is provided which is very flexible to meet the requirement wherever a hauling device is used.

In order to accommodate differently sized traction wheels and tires on the motor truck, differently sized pulley wheels are provided for attachment to the driving shaft 12, and it is, of course, possible to vary the gearing ratios between the driving shaft and the two winding drums.

Actual use of the hauling device under all kinds of conditions and in all kinds of operations has proven very successful and have revealed results that heretofore have been impossible with portable devices of this class. Because of its portable nature and without the necessity of altering the motor truck in any way to be adapted to receive the hauling device, the invention fulfills a long felt need where devices of this type are necessary.

It is understood that the invention may be used in many ways, and that there are various modifications in the structure of the invention which will be within the spirit and scope of the appended claims.

I claim:

1. In combination with a motor truck having traction wheels, a portable hauling device slidably mounted thereon, said device including a frame having spaced drums mounted thereon, one of said drums having fixed gears adjacent the ends thereof, a driving shaft having axially slidable gears arranged to mesh with said fixed gears, driving members connected to the driving shaft and arranged to engage the traction wheels of the motor truck, means connecting the drive shaft to the other of said drums, and means for moving the driving members into and out of engagement with the traction wheels.

2. In combination with a motor truck having traction wheels, a portable hauling device slidably mounted thereon, said device including a frame having a driving shaft journalled thereon, spaced drums mounted one above the other on said frame, driving members connected to the driving shaft and arranged to engage the traction wheels of the motor truck, axially slidable gears keyed to the driving shaft, aligned fixed gears on one of said drums, medially disposed means for moving the slidable gears into and out of engagement with the fixed gears, means operatively connecting the driving shaft to the other of said drums and means for moving the driving members into and out of engagement with the traction wheels.

3. In combination with a motor truck having traction wheels, a portable hauling device slidably mounted thereon, said device including a frame having a driving shaft journalled thereon, spaced drums of different diameters mounted on said frame, driving members connected to the driving shaft and arranged to engage the traction wheels of the motor truck, axially slidable gears keyed to the driving shaft, aligned fixed gears on one of said drums, medially disposed means for moving the slidable gears into and out of engagement with the fixed gears, and clutch means operatively connecting the driving shaft to the other of said drums, whereby to selectively control the actuation of said drums.

GEORGE E. NICHOLS.